United States Patent [19]
Safranek et al.

[11] Patent Number: 5,900,020
[45] Date of Patent: May 4, 1999

[54] METHOD AND APPARATUS FOR MAINTAINING AN ORDER OF WRITE OPERATIONS BY PROCESSORS IN A MULTIPROCESSOR COMPUTER TO MAINTAIN MEMORY CONSISTENCY

[75] Inventors: Robert J. Safranek; Thomas D. Lovett; Robert T. Joersz, all of Portland; Bruce M. Gilbert, Beaverton, all of Oreg.

[73] Assignee: Sequent Computer Systems, Inc., Beaverton, Oreg.

[21] Appl. No.: 08/678,372

[22] Filed: Jun. 27, 1996

[51] Int. Cl.$^6$ ............................ G06F 13/14; G06F 13/24; G06F 13/42

[52] U.S. Cl. ........................ 711/167; 711/148; 711/147; 711/141; 395/200.43; 395/200.44; 395/292; 395/859; 395/735

[58] Field of Search ....................... 711/141, 119, 711/120, 121, 147, 148, 167, 200.43, 200.44, 292, 874, 878, 879, 859, 735, 736

[56] References Cited

U.S. PATENT DOCUMENTS

| | | | |
|---|---|---|---|
| 5,193,163 | 3/1993 | Sanders et al. | 711/122 |
| 5,398,325 | 3/1995 | Chang et al. | 711/3 |
| 5,420,991 | 5/1995 | Konigsfeld et al. | 711/150 |
| 5,463,753 | 10/1995 | Fry et al. | 711/146 |
| 5,579,504 | 11/1996 | Callander et al. | 711/144 |
| 5,623,629 | 4/1997 | Suzuki | 711/141 |
| 5,699,552 | 12/1997 | Whittaker | 711/146 |

OTHER PUBLICATIONS

Multiprocessor Interconnection Using SCI, Master Thesis by Ivan Tving, Advanced Computer Research Institute, Lyon, and Dept. of Comp. Sci., Technical Univ. of Denmark, pp. 1–60.

Performance Evaluation of memory Consistency Models for Shared–Memory Multiprocessors; K. Gharachorloo, A. Gupta, J. Hennessy, Computer Systems Laboratory, Stanford University, pp. 1–13 (Date Unknown).

Local–Area MultiProcessor: The Scalable Coherent Interface; D. Gustavson and Q. Li; SCIzzL, Santa Clara Univ., Dept. of Comp. Engineering, 1994, pp. 1–24.

The Design and Analysis of Dash: A Scalable Directory–Based Multiprocessor; D. Lenoski, Computer Systems Lab., Depts. of Elect. Eng. and Comp. Sci., Stanford Univ., Feb. 1992, pp. i–176.

Synchronization, Coherence, and Event Ordering in Multiprocessors; M. Dubois, C. Scheurich and F. Briggs; IEEE, Computer, Feb. 1988, pp. 9–21.

(List continued on next page.)

*Primary Examiner*—Glenn Gossage
*Attorney, Agent, or Firm*—Klarquist Sparkman Campbell Leigh & Whinston

[57] ABSTRACT

A method and apparatus for maintaining processor consistency in a multiprocessor computer such as a multinode computer system are disclosed. A processor proceeds with write operations before its previous write operations complete, while processor consistency is maintained. A write operation begins with a request by the processor to invalidate copies of the data stored in other nodes. This current invalidate request is queued while acknowledging to the processor that the request is complete even though it has not actually completed. The processor proceeds to complete the write operation by changing the data. It can then execute subsequent operations, including other write operations. The queued request, however, is not transmitted to other nodes in the computer until all previous invalidate requests by the processor are complete. This ensures that the current invalidate request will not pass a previous invalidate request. The invalidate requests are added and removed from a processor's outstanding invalidate list as they arise and are completed. An invalidate request is completed by notifying the nodes in a linked list related to the current invalidate request that data shared by the node is now invalid.

23 Claims, 8 Drawing Sheets

OTHER PUBLICATIONS

Cache Consistency and Sequential Consistency; J. Goodman; IEEE Scalable Coherent Interface (SCI) Working Group, Technical Report No. 61, Mar. 1989, pp. 1–4.

Memory Consistency and Event Ordering in Scalable Shared–Memory Multiprocessors; K. Gharachorloo, D. Lenoski, J. Laudon, P. Gibbons, A. Gupta and J. Hennessy; Proceedings of $17^{th}$ Symp. on Comp. Arch., May 1990, pp. 15–26.

The Symmetry Multiprocessor System; Tom Lovett, Shreekant Thakkar; Proceedings of the 1988 International Conference on Parallel Processing; Aug. 15–19, 1988, pp. 303–310.

The MIT Alewife Machine: Architecture and Performance; Anant Agarwal, Ricardo Bianchini et al.; Proceedings The 22nd Annual International Symposium on Computer Architecture; Jun. 22–24, 1995, pp. 2–13.

The NUMAchine Multiprocessor; Z. Vranesic, S. Brown, M. Stumm et al.; Dept. Of Electrical and Computer Engineering, University of Toronto; Jun. 28, 1995, pp. 1–35.

The Stanford Dash Multiprocessor; Daniel Lenoski, james Laudon, Kourosh Gharachorloo et al.; Stanford University; IEEE, Computer, Mar. 1992, pp. 63–79.

METHOD AND APPARATUS FOR MAINTAINING AN ORDER OF WRITE OPERATIONS BY PROCESSORS IN A MULTIPROCESSOR COMPUTER TO MAINTAIN MEMORY CONSISTENCY

FIELD OF THE INVENTION

This invention relates to computer architecture. More particularly, this invention relates to a multinode, multiprocessor computer system that utilizes an unordered network for communication among the nodes in the computer system.

BACKGROUND OF THE INVENTION

Multiprocessor computers by definition contain multiple processors that typically can execute multiple parts of a computer program or multiple programs simultaneously in a manner known as parallel computing. In general multiprocessor computers execute computer programs faster than conventional single processor computers, such as personal computers (PCs), that must execute the parts of a program sequentially. The actual performance advantage is a function of a number of factors, including the degree to which parts of a program can be executed in parallel and the architecture of the particular multiprocessor computer at hand.

Multiprocessor computers may be classified by how they share information among the processors. Shared-memory multiprocessor computers offer a common memory address space that all processors can access. Processes within a program communicate through shared variables in memory which allow them to read or write to the same memory location in the computer. Message passing multiprocessor computers, on the other hand, have a separate memory space for each processor. Processes communicate through messages to each other.

Multiprocessor computers may also be classified by how the memory is physically organized. In distributed memory computers, the memory is divided into modules physically placed near each processor. This placement provides each processor with faster access time to its local memory. By contrast, in centralized memory computers, the memory is physically located in just one location, generally equally distant in time and space from each of the processors. Both forms of memory organization use high-speed cache memory in conjunction with main memory to reduce execution time.

Multiprocessor computers with distributed shared memory are often organized into nodes with one or more processors per node. Also included in each node are local memory for the processors, a remote cache for caching data obtained from memory in other nodes, and logic for linking the node with other nodes in the computer. A processor in a node communicates directly with the local memory and communicates indirectly with memory in other nodes through the remote cache. For example, if the desired data is in local memory, a processor obtains the data directly from local memory. But if the desired data is stored in memory in another node, the processor must access its remote cache to obtain the data. A cache hit occurs if the data has been obtained recently and is presently stored in the cache. Otherwise a cache miss occurs, and the processor must obtain the desired data from the local memory in another node through the linking logic.

An important factor in the design of a multiprocessor computer system is the memory consistency model that is supported by the computer system. The memory consistency model defines the apparent order of the reads and writes (i.e., loads and stores) from all of the processors in the computer system and how that apparent order relates to the order of the reads and writes specified in the program being executed. The strongest consistency model, sequential consistency, requires that all processors see the same order of operations (reads and writes) and that all operations are seen in the order specified in the program. In weaker consistency models, different processors can see different orders, and operations do not have to appear in the order specified in the program. A "fence" operation is provided to the programmer as a means for the programmer to indicate in a program where the program order must be maintained. Many commercial multiprocessor computers have implemented a consistency model called processor consistency. In this model the order of writes from a single processor must be observed in that order by all other processors, but reads may be observed out of order from writes. There are no ordering requirements placed on writes from different processors. The processor consistency model is described in U.S. Pat. No. 5,420,991.

It is generally recognized in the literature that weaker consistency models can lead to higher performance. See, for example, "Performance Evaluation of Memory Consistency Models for Shared-Memory Multiprocessors" by Gharachorloo et al., *Proc. Fourth Int. Conf. on Architectural Support for Programming Languages and Operating Systems*, pages 245–257, April 1991. However, many programs have been written assuming the stronger processor consistency model is followed, and therefore maintaining compatibility with these programs is extremely important in the design of multiprocessor computers.

Most commercial multiprocessor computer systems use a set of signal conductors known as a common bus to electrically interconnect the various parts of the computer including the processors, caches, I/O devices and memory modules. In a bus-based multiprocessor computer, operations taken by each processor are necessarily seen by the other processors in the order in which they are emitted. If a processor emits reads and writes in an order that maintains processor consistency, then the bus ensures that all other processors see the reads and writes in that order. Examples of bus-based interconnection architectures for multiprocessors are Sequent Symmetry computers from Sequent Computer Systems, Inc. of Beaverton, Oregon (described by Lovett et al. in *Proceedings '88 Int'l Conference on Parallel Processing*, Vol. 1, Penn State University Press, 1988, pp. 303 et seq.) and the Futurebus+standard (IEEE 896.1-1990).

Bus-based architectures, however, suffer from performance limitations inherent in their designs. The bus has a maximum bandwidth for transferring data between processors. As processor frequencies have increased, each processor requires more bandwidth to run at maximum speed. Given a maximum bus bandwidth, fewer processors can run at the faster speeds. On the other hand, to increase the bus bandwidth, the physical length of the bus must be shortened to reduce electrical propagation delay from one end of the bus to the other. But a shorter bus length reduces the space available for connecting processors and thus the number of processors that can be connected to the bus. Typical bus-based multiprocessor architectures have an upper limit of 10–30 processors.

One proposed solution to this problem of limited data throughput is to use a point-to-point network to interconnect multiple processor nodes together. Each node includes within it a bus limited to a length and number of processors that allow the processors to perform at the maximum processor frequency. Data communication between the nodes of the computer is handled through an interface, or protocol, such as the Scalable Coherent Interface (SCI) set forth in IEEE Standard 1596. The interface between network nodes may be realized with a number of topologies such as rings, meshes, multistage networks and crossbars. The current SCI standard supports up to 65,520 nodes and specifies the supported interface to run at 500 MHZ over 16 parallel lines, yielding a raw data throughput of one gigabyte/second. Furthermore, an SCI-based interconnection network can send a symbol stream from one point to another within the network without having to wait for the signals to propagate through the entire interface. In this way, a sequence of symbols may simultaneously reside on the transmission medium. Thus an SCI-based network can provide the data throughput needed to meet the demands of advanced processors now being designed into multiprocessor computers.

While solving the data throughput problem, the point-to-point approach creates another problem: it provides no guarantee that operations will be performed in the order they are emitted. Even if a processor emits operations in an order that maintains processor consistency, some networks do not guarantee that the operations reach all destinations in the order they were emitted. SCI communication, for example, is through message packets that contain, among other things, the address of the source and destination nodes and the data to be communicated. These messages may traverse various nodes in their journey from the source to destination nodes, and may arrive at the destination in a different order than which they were sent. For example, processor A in one node may send an invalidate message to processor C in another node to alert the processor C that certain data the processors share in their respective caches is no longer valid in the cache of processor C. Processor A may send this message because it is changing its copy of the data through a write operation. When processor A is finished changing the data, it then sends a second message indicating that the data in its node is now available to other processors. For the messages to work correctly, processor C must receive the first message before it receives the second message. Otherwise, upon reading the second message, processor C assumes that the data presently in its cache is already valid (that no change has occurred) and may access that invalid data rather than the changed data in the cache of processor A.

A simple approach for maintaining processor consistency in an unordered networked multiprocessor computer is to delay completion of a write operation until all other processors that share the data acknowledge that they have invalidated their copies. But this approach stalls further program execution until all of the acknowledgments are received, creating delays that significantly degrade overall processor performance.

A higher-performance approach is to allow the processor to proceed when possible with another write operation before all acknowledgments are received. This approach would enhance computer performance. But some mechanism must then ensure that write operations are received by processors in other nodes in the order in which the write operations are issued by the processor. However, no commercially viable approach that ensures this result is presently known to exist.

An objective of the invention, therefore, is to provide a method and apparatus for maintaining a desired memory consistency in an unordered networked multiprocessor computer system. Another objective of the invention is to allow operations following a write operation to complete as soon as possible while maintaining memory consistency. Still another objective is to maintain such consistency while allowing write operations to complete before all other processors that share the data have acknowledged that they have invalidated their copies.

SUMMARY OF THE INVENTION

In accordance with the invention, a method of maintaining memory consistency in a multinode computer comprises the following steps. When a processor executes a write operation, it begins with a request to invalidate other copies of the data about to be changed which are shared by the nodes of the computer. This invalidate request is queued in the processors's node but immediately acknowledged as complete even though it is not. The acknowledgment permits the processor to complete the write operation by changing the data and then proceed with other operations. The queued request, however, is not transmitted until previous invalidate requests by the processor are complete. This ensures that the current invalidate request will not pass a previous invalidate request, and memory consistency is maintained. Once the previous invalidate requests are complete, the queued request is completed.

The method can be extended to circumstances where a read request should not be answered until after an invalidate request is complete. After a processor in a first node receives a request for data from a second node, a determination is made if there is an outstanding, or pending, invalidate request in the first node. If so, transmission of the data to the second node is delayed until the pending invalidate request is complete. If not, the data is transmitted to the second node. The determination can be made by taking a snapshot of a current invalidate list, the list containing acknowledgments to the processor that an invalidate request is complete before it has completed, to determine the pending invalidate requests.

Similarly, the method can be extended to circumstances where an interrupt signal should not be transmitted until after invalidate requests related to updating of data are complete. After a node receives an interrupt signal from an input/output I/O device or one of the node's processors, a determination is made if there is a pending invalidate request. If so, transmission of the interrupt signal to the intended nodes is delayed until the pending invalidate request is complete. If not, the signal is transmitted to the intended nodes. The determination can be made by taking a snapshot of a current invalidate list to determine the pending invalidate requests.

The foregoing and other objects, features, and advantages of the invention will become more apparent from the following detailed description of a preferred embodiment which is described with reference to the accompanying drawings.

BRIEF DESCRIPTION OF THE DRAWINGS

FIG. 6 includes diagrams of several lists maintained by the computer system to track outstanding invalidate requests in accordance with the invention.

DETAILED DESCRIPTION OF A PREFERRED EMBODIMENT

Figure 1:
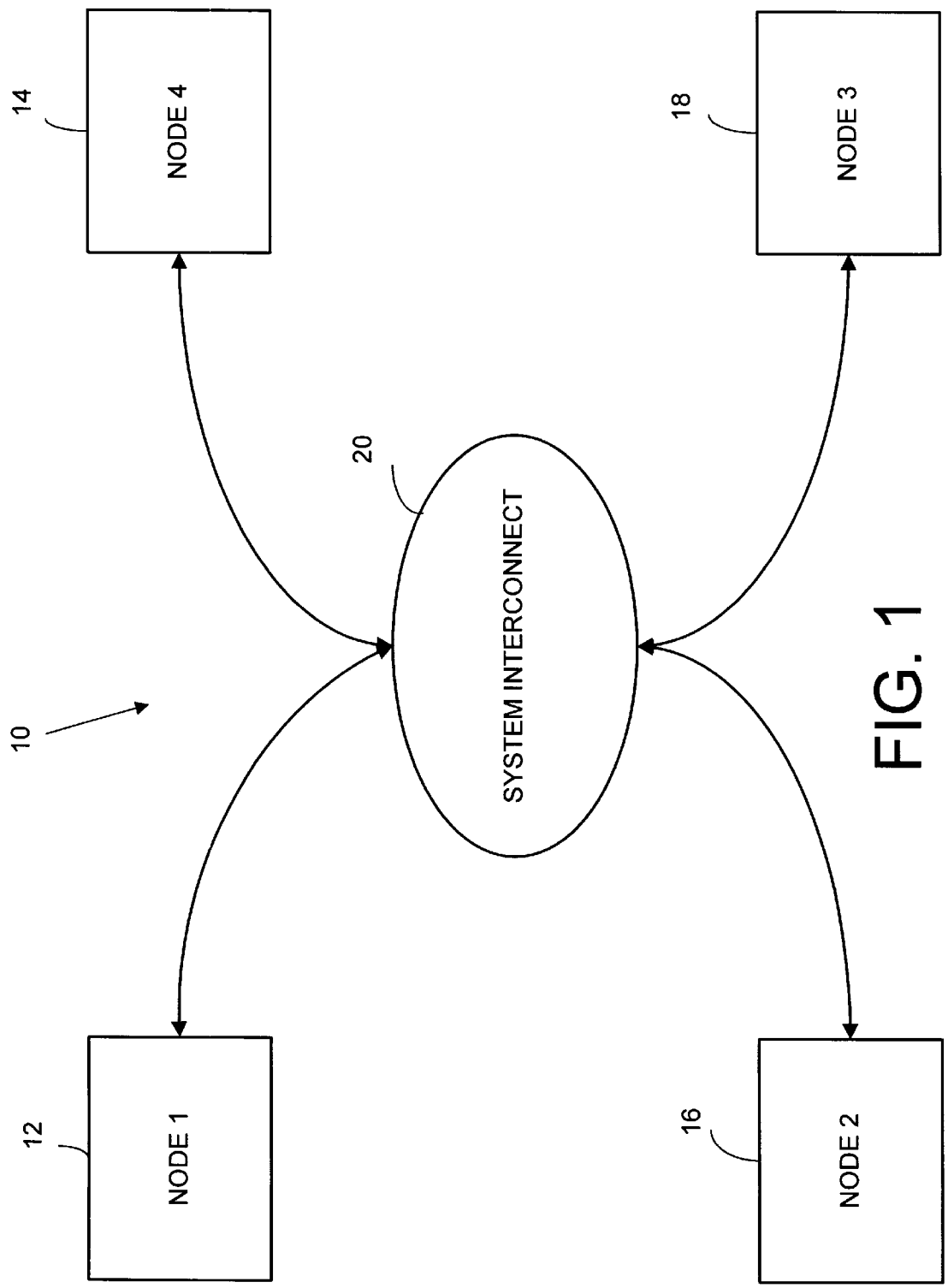
FIG. 1 is a block diagram of a multinode, multiprocessor computer system in accordance with the invention.

FIG. 1 is a block diagram of a multinode, multiprocessor computer system 10 in accordance with the invention. System 10 uses a computer architecture based on Distributed-Shared Memory (DSM). Four nodes 12-18 are shown connected by a system interconnect 20 that permits any node to communicate with any other node. Specifically, the purpose of interconnect 20 is to allow processors in any node to access the memory resident in any other node with cache coherency guaranteed. System interconnect 20 is a switch-based network that uses the Scalable Coherent Interface (SCI) interconnection mechanism. SCI is an IEEE-approved standard, or protocol (1596), well documented in a number of publications including IEEE Std 1596–1992 (2 Aug. 1993) and *Multiprocessor interconnection using SCI*, a Master Thesis by Ivan Tving, DTH ID-E 579 (1994), both of which are hereby incorporated by reference.

The physical links of interconnect 20 provide high bandwidth and low latency and are scalable to allow for the addition of more nodes. Links that meet these requirements include point-to-point interconnects with a data throughput of one gigabit/second or greater. The links can be configured in any number of suitable ways for connecting nodes 12-18, such as in a ring topology, in arbitrary topologies through switches, or in a combination of both. The links can be wired or wireless (optical, radio frequency (RF), etc.) depending upon system performance needs. Additional topologies are described in "Interconnect Topologies with Point-To-Point Rings," Ross E. Johnson and James E. Goodman, December 1991, *Computer Sciences Technical Report* #1058, University of Wisconsin - Madison.

Figure 2:
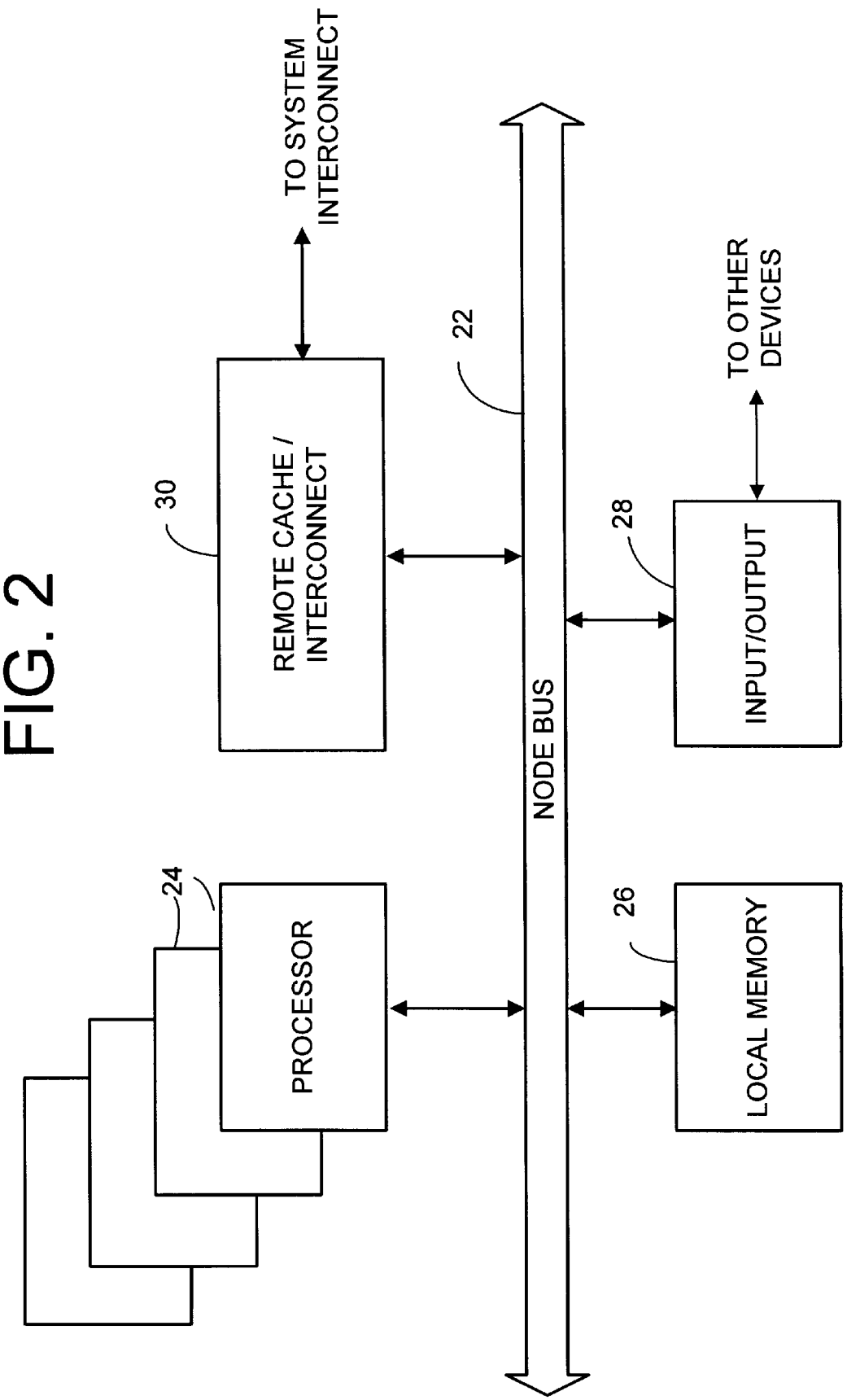
FIG. 2 is a block diagram of one of the nodes of the computer system of FIG. 1.

A block diagram of node 12 of system 10 is shown in FIG. 2. The node includes a conventional symmetrical multiprocessor (SMP) node bus 22 for connecting multiple data processors 24 to local memory 26. For clarity, node 12-18 may be referred to as home nodes or remote nodes in certain circumstances. A home node is one whose local memory stores a memory block of interest (i.e., the address of the memory block falls within the address range supported by the local memory); all of the other nodes are then remote nodes with respect to that memory block. Additionally, a node may be a requesting node or a responding node. A requesting node is one requesting data; a responding node is one furnishing such data. Input/output (I/O) device 28, which is also connected to bus 22, connects the node to devices outside computer system 10 for communicating information between the computer system and the outside world. I/O device 28 may be of conventional design and includes means such as a cable for connecting the node (and hence system 10) to personal computers, local area networks, etc., that wish to utilize the capability of the multinode computer system. To connect node 12 to the other nodes in the system, the node includes an interconnect device 30. The device forms part of system interconnect 20 along with the physical links between nodes and the same devices in the other nodes of the computer system 10. In the present embodiment device 30 is constructed to implement the SCI standard for data communication between the nodes, allowing a processor in one node to access data stored in another node. The device 30 also contains a remote cache in the present embodiment, although this combination is not required for the invention. The remote cache could be separate from the interconnect device.

Figure 3:
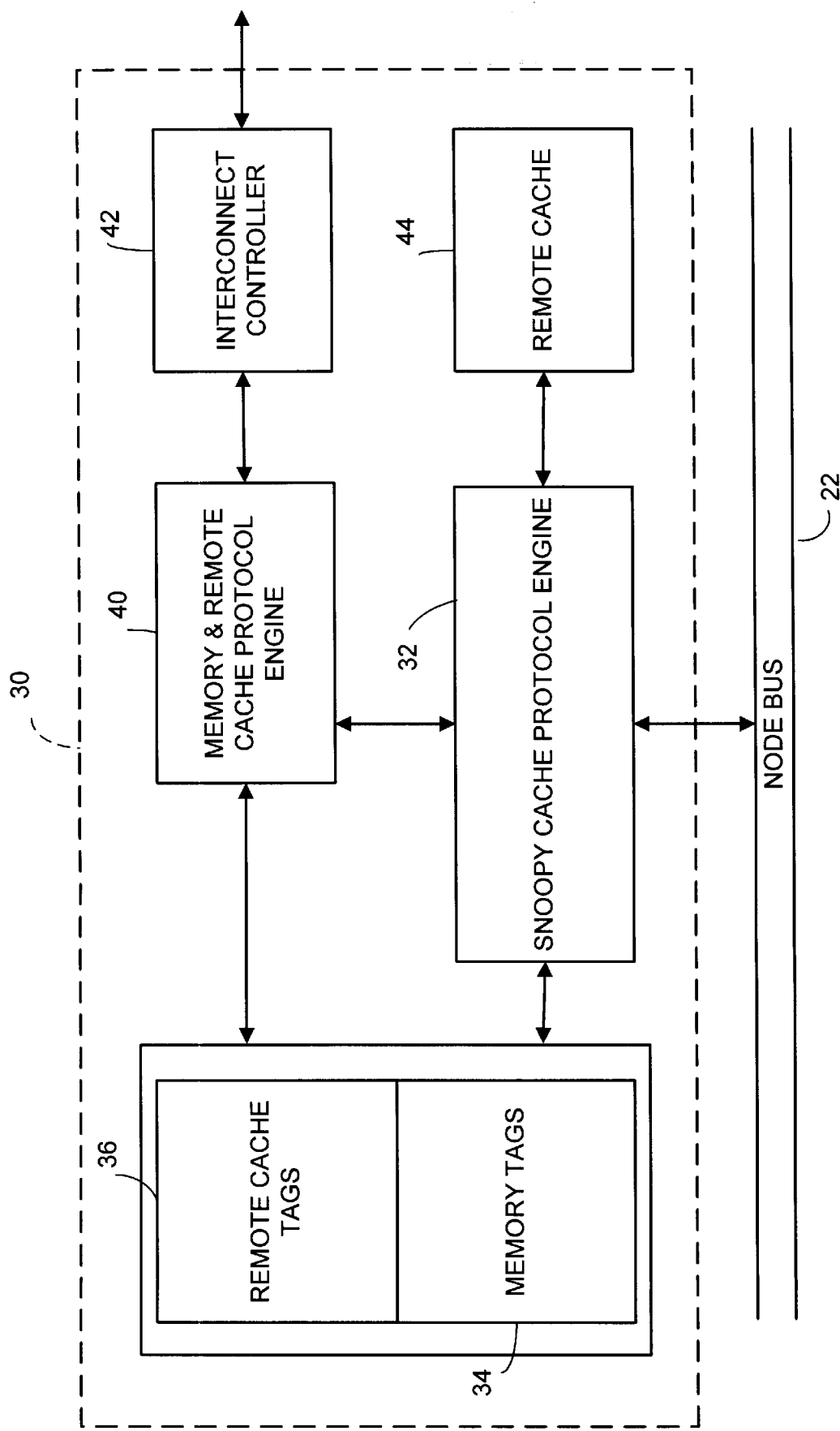
FIG. 3 is a block diagram of an interconnect device within the node of FIG. 2.

FIG. 3 is a block diagram showing the interconnect device 30 in more detail. The device includes a snoopy cache protocol engine 32; storage for memory and remote cache tags 34 and 36; a memory & remote cache protocol engine 40; an interconnect controller 42; and a remote cache 44. The protocol engines 32 and 40 include cache controllers for carrying out their functions.

Figure 4:
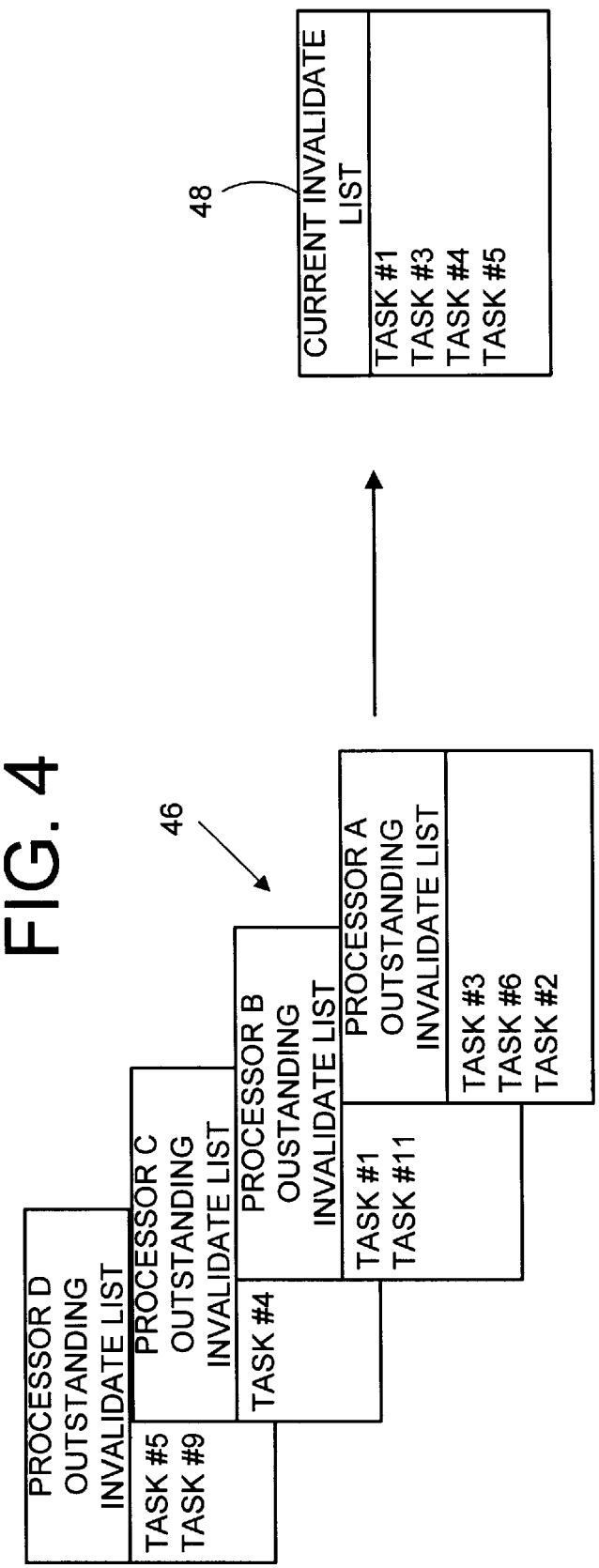
FIG. 4 is a diagram showing the fields of a memory tag associated with each local memory block, a cache tag associated with each line of the remote cache.

To maintain coherence among the remote caches in the nodes of computer system 10, the system uses a chained directory scheme defined in the SCI protocol. The chained directory is implemented as a doubly linked sharing list that keeps track of which caches share the same data. With this sharing list, remote caches can be notified when the data they share has been changed and thus is no longer valid. FIG. 4 shows the makeup of a remote cache tag 36, which tags are the elements of the sharing list. The remote cache tag is linked into the chained directory to indicate that the node's remote cache 44 contains a copy of the shared data. Tag 36 contains a number of fields including the Address field, which identifies the memory block cached in the remote cache, and the Cache State field, which gives the state of the cache.

Figure 5:
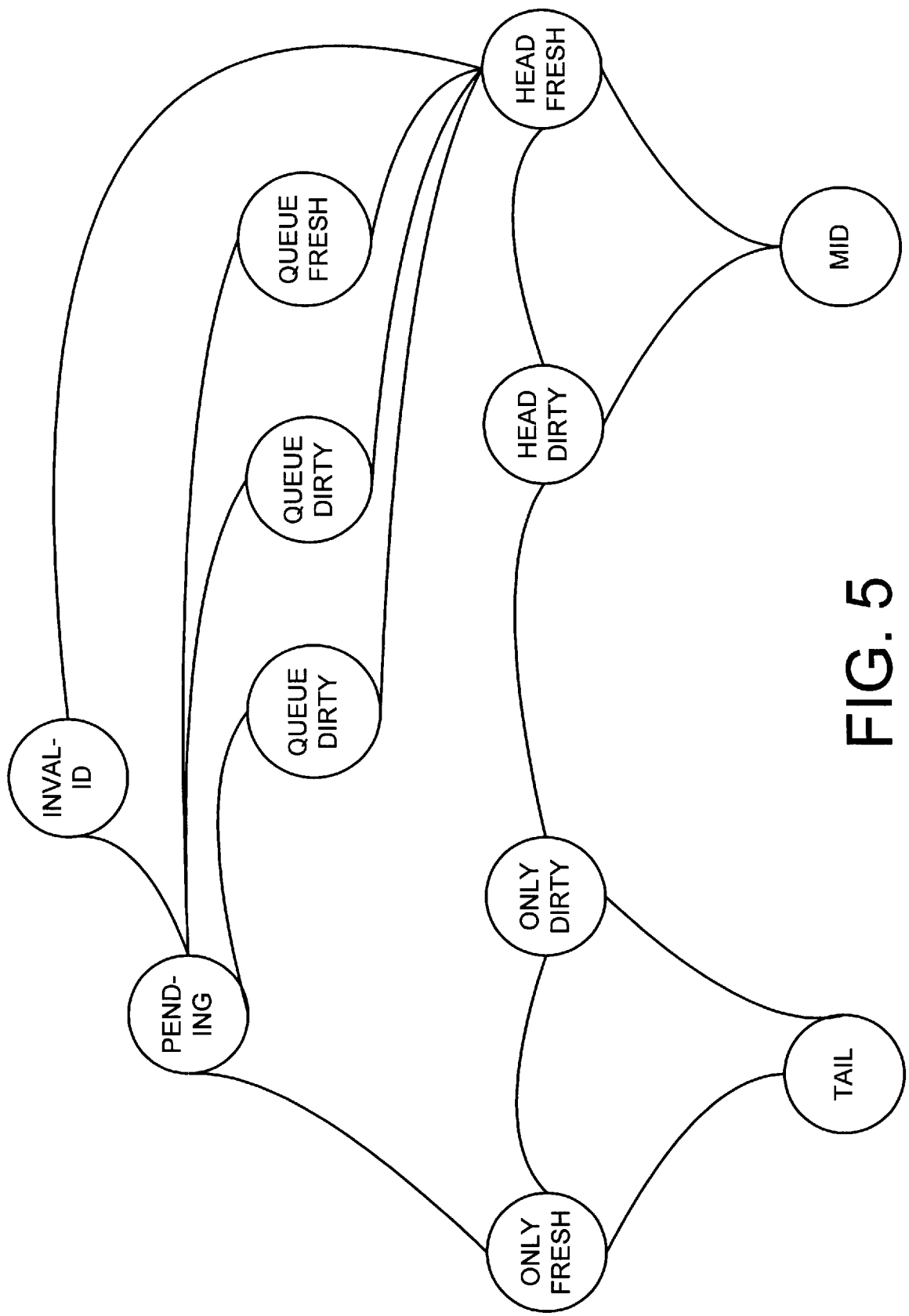
FIG. 5 is a state diagram of the remote cache states according to the invention.

The remote cache states used in the present embodiment are shown in the state diagram of FIG. 5. Table 1 identifies and describes the pertinent cache states.

TABLE 1

| Name | Description |
|---|---|
| CS_INVALID | Line is invalid and can be used for caching new lines |
| CS_ONLY_FRESH | Only cached copy, consistent with memory |
| CS_ONLY_DIRTY | Only cached copy, write-able and inconsistent with memory |
| CS_HEAD_FRESH | Head of fresh list, consistent with memory |
| CS_HEAD_DIRTY | Head of valid list, writeable and inconsistent with memory |
| CS_MID_VALID | Mid element in valid list, possibly inconsistent with memory |
| CS_TAIL_VALID | Tail of valid list, possibly inconsistent with memory |
| OD_RETN_IN | Only_Dirty block getting off list |
| OD_SPIN_IN | Prepend while getting off list |
| CS_QUEUED_FRESH | Attached to list, notifying old head |
| CS_QUEUED_DIRTY | Attached to fresh list for write, invalidating list |
| CS_PENDING | Waiting for response from home node local memory |
| CS_QUEUED_JUNK | Attached to dirty list, getting data from old head |
| MV_FORW_MV | Rollout from MID, waiting for response from ForwID |
| MV_BACK_IN | Rollout from MID, waiting for response from BackID |
| HD_INVAL_OD | Write to dirty list, invalidating list |
| OF_RETN_IN | Rollout from Only_Fresh, waiting for response from Memory |
| HD_FORW_HX | Rollout from Head_Dirty |
| HD_FORW_OX | List Collapsed during rollout from |

TABLE 1-continued

| Name | Description |
|---|---|
| | Head_Dirty |
| OF_MODS_OD | Writing to Only_Fresh list, transitioning to Only_Dirty |
| HF_FORW_HX | Rollout from Head_Fresh |
| HF_FORW_OX | List Collapsed during rollout from Head_Fresh |
| HF_MODS_HD | Write to fresh list, converting list to dirty |
| TO_INVALID | Invalidated while getting off list |
| TV_BACK_IN | Rollout from Tail |
| HX_RETN_IN | Rollout from Head, informing home node local memory of new head |

Returning to FIG. 4, the other fields are well defined in the SCI protocol. The Forward Pointer field contains a pointer to a previous cache in the sharing list, toward the list tail. The Backward Pointer field contains a pointer to a later cache or to a local memory in the sharing list, toward the list head. Elements are added to a sharing list at the head of the list, with the oldest element thus being the tail of the list. The Valid field is set to indicate that the cache tag is valid. The Locked field is set to indicate that this cache tag is to presently remain in the cache tag storage and not be replaced by the cache line replacement algorithm.

The state of local memory 26 is maintained in the memory tags 34. The memory tags store information about the states of the memory blocks, or lines, stored within local memory 26. FIG. 4 shows the composition of a memory tag, one of which is associated with each memory block. The tag has two fields: a Memory State field which indicates the state of the data in the memory block, and a Head Pointer field. Table 2 identifies and describes the pertinent memory states in a memory tag.

TABLE 2

| Name | Description |
|---|---|
| MS_HOME | No sharing list exists and memory is valid |
| MS_FRESH | Sharing list copies are identical with memory |
| MS_GONE | Sharing list copies might be different from memory |
| MS_BUSY | Memory state is being changed due to a home node access |

The Head Pointer field contains a pointer which, if the memory state of the block is GONE or FRESH, points to the node whose remote cache is the head of the sharing list and in which valid data for that memory block is cached.

Table 3 shows typical cache states in a sharing list for the given memory state.

TABLE 3

| Memory | Head | Mid | Tail |
|---|---|---|---|
| MS_HOME | — | — | — |
| MS_FRESH | CS_ONLY_FRESH | — | — |
| MS_FRESH | CS_HEAD_FRESH | — | CS_TAIL_VALID |
| MS_FRESH | CS_HEAD_FRESH | CS_MID_VALID | CS_TAIL_VALID |
| MS_GONE | CS_ONLY_DIRTY | — | — |
| MS_GONE | CS_HEAD_DIRTY | — | CS_TAIL_VALID |
| MS_GONE | CS_HEAD_DIRTY | CS_MID_VALID | CS_TAIL_VALID |

Note that the cache state also reflects the location of the node in the sharing list: head, midpoint, or tail.

FIG. 6 includes examples of two lists that are maintained by protocol engine 40 in accordance with the invention. The protocol engine 40 keeps an outstanding invalidate request list 46 for each processor in the node. An invalidate request, when made by a processor, spawns a task. The task has an associated number that is used by the protocol engine 40 to track the request. Each list 46 may be implemented as a queue in hardware such as in a register or in software such as in a data structure, or in a combination of both. The list 46 tracks whether a processor has an outstanding invalidate request (such as by clearing or setting an "active" bit or list emement) and the tasks spawned to generate invalidate requests (such as by storing task numbers). An invalidate request is outstanding when it is not complete; that is, when all nodes on a sharing list for the data have not been notified that the shared data is invalid. Consequently, an invalidate request is complete when the sharing list is invalidated, or dissolved. The last task number in list 46 is the tail of the queue and is visible to the protocol engine 40 so that the protocol engine knows where to add additional tasks for generating invalidate requests. The head of the queue, or list, is the active invalidate request, the one the protocol engine is executing. As invalidate requests are completed, tasks are removed from the top of the queue and it shortens until all tasks are completed and the list indicates this, such as by clearing the active bit. As tasks (invalidate requests) are added to the bottom of the queue, the queue lengthens.

The protocol engine 40 also keeps a current invalidate list 48 for all the processors in the node, which also may be implemented in hardware, software, or a combination of both. The list 48 tracks which tasks for generating invalidate requests have been acknowledged to the processor requesting them as completed, but in reality have not yet been completed. The two lists, then, do not contain the same information. List 46 indicates which invalidate requests for a given processor are not complete. List 48 indicates which invalidate requests for all processors in the node have been acknowledged as completed but which, in fact, are not. As indicated in FIG. 6, a task initially appears in a list 46 and then is added to list 48 when the protocol engine acknowledges to the processor that the task is completed even though it is not. The task is removed from both lists when the task actually completes.

With this as background, the structure and operation of interconnect device 30 (shown in FIGS. 2 and 3) can now be understood by way of example. If a processor 24 in node 12 requests data (the processor request is a read), the request is first reviewed by snoopy cache protocol engine 32. The protocol engine compares the address of the requested data with the memory tags 34 and remote cache tags 36 to determine if the data is stored in the node. If the data's address is in local memory, then node 12 is the home node for the memory block containing the data. A memory tag 34 exists and indicates whether the data is valid and, if not, indicates through the head pointer in which node the valid data can be found. If the data's address is not in local memory 26, there is no memory tag 34 for it. However, if a copy of the data has previously been stored in remote cache 44, then a cache tag 36 exists in the node for the data. The tag 36 indicates whether the data is valid and, if not, in which node the valid data can be found.

If the processor request is a write, the protocol engine 32 again reviews the address to determine if a memory tag 34 or cache tag 36 exists in the node for the address. The procedure is the same as for the read, except that any sharing list containing the data to be changed by the write is invalidated. If the data to be changed is already in remote cache 44, then the node is already in a sharing list. Unless the node is already the head of the list, it must first be removed and then made the head before the list is invalidated. Protocol engine 40 in node 12 sends a message to the node "below" it in the list, passing its backward pointer so that the node below now points to the node "above" node 12. Protocol engine 40 then sends a message to the node above, passing its forward pointer so that the node above now points to the node below. Node 12 is now off the sharing list. Protocol engine 40 now sends a message to the home node for the data being changed, indicating that it wants to be head of the list and be allowed to write the memory block containing the data. The home node responds by setting its head pointer to point to node 12, changing its memory state to GONE, and returning the requested data in the memory block and the pointer to the old head of the current sharing list for the memory block. Finally, protocol engine 40 sends a message to the old head informing the old head that it is no longer the head. Protocol engine 40 proceeds to invalidate the list by sending the appropriate command to each node in the list, in turn. The cache state of tag 36 in node 12 for this memory block is now ONLY_DIRTY, since it is presently the only element of the list. If processors in other nodes read this data, these nodes are added to the list and the state of tag 36 changes to TAIL.

Messages are sent between nodes through the memory & remote cache protocol engine 40 and interconnect controller 42 in standard SCI format. Protocol engine 40 puts together the appropriate SCI packet and passes it to controller 42 for sending to the desired node. The interconnect controller provides the SCI-compliant link-level interface to the other nodes of system 10. It also contains the link-level queues and the associated arbitration, queue mechanisms, and error checking to provide SCI-packet delivery services for the node.

Returning to the example, if the requested data is not in remote cache 44 or local memory 26, the snoopy cache protocol engine 32 passes the data request to remote cache protocol engine 40. Protocol engine 40 then sends the request in the manner described via controller 42 to the home node for the data, such as node 14. The memory tag for the requested memory line in node 14 is checked to determine if the data stored in memory is valid (HOME or FRESH). If so, node 14 returns a copy of the data to node 12. The memory tag's head pointer in node 14 is changed to point to remote cache 44 in node 12 as the new head of the list of nodes sharing the data. If the processor request from node 12 is for a possible write, the tag's memory state is also changed, to GONE.

The data retrieved from node 14 is sent to node 12 and provided to the processor as well as stored in remote cache 44. A remote cache tag 36 is then created for the stored data. At this point, the address of the retrieved memory block, the cache state and the backward pointer (the node where the memory from which the data was retrieved is located, here node 14) are known and these fields in the cache tag 36 in node 12 are completed. If the processor request is a write, then remote cache 44 is now the head of a new sharing list and there is no forward pointer to other list elements. If the processor request is a read and the memory state is FRESH (indicating at least one remote cache has a valid copy of the memory's data line), then the tag's forward pointer is set to point to the node having the valid copy.

The list will grow as other nodes obtain copies of the data in remote cache 44. For example, if node 14, 16 or 18 requests the same data now in the remote cache of node 12, the requesting node becomes the head of the list. The backward pointer for the remote cache tag in node 12 changes from pointing to the node whose memory contains the data to pointing to the new list head.

Sharing lists are maintained so that all nodes that share the same data can be notified when the shared data is changed by a processor write operation. A write operation has two steps: first, the processor requests that other copies of the data to be written be invalidated; second, the processor writes the new data into storage in its node. The invalidating request is passed to the protocol engine 40, which responds to the operation by making the protocol engine's node the head of the list and then notifying each element in the linked sharing list that data in their cache is about to be changed. This notification may take the form of a communication from the head of the list to the next element to change its cache state to INVALID and to return to the head of the list a pointer to the following list element. The protocol engine proceeds down the list until the last element returns an end-of-list marker. The protocol engine 40 recognizes that this element is the end of the list and that all copies of the data to be changed have been invalidated. This is known as invalidating the sharing list. According to standard SCI protocol, only now would the protocol engine acknowledge to the processor that the invalidation request step is complete. The processor can then proceed with the second step of writing the new data.

Alternatively, the sharing list can be invalidated by having each element in the list relay the invalidate request to the next list element. This may reduce the time to complete the invalidate step since the pointers to each element need not be communicated to the head of the list.

For example, assume that a sharing list for a certain memory block located in local memory of node 18 is headed by node 14 and also contains node 12 and node 16. If a processor 24 in node 12 now writes to this block in its remote cache 44, then the other nodes in the sharing list are notified to invalidate their copies of the data and the list is dissolved. Node 18 is also notified to change the memory state for the memory block to GONE. The head pointer for the memory tag in node 18 for this memory block is changed to point to node 12. A new list is created, with node 12 as the only element.

The SCI protocol does not specify a preferred memory consistency model for a multinode, multiprocessor computer, nor does it specify how a model should be implemented. The simplest way to implement any of the memory models such as sequential consistency or processor consistency is to delay each subsequent operation by a processor until a previous operation by the processor is complete. This approach avoids the problem of a write passing a write, i.e., a second write operation being seen by another node before that node sees a first write operation.

But the tradeoff for using this approach is significant delay as each subsequent operation is held up until all the affected nodes acknowledge that the prior operation has been seen.

The invention takes a novel approach that maintains the desired memory consistency while significantly reducing the delay between processor operations. By acknowledging the invalidate requests as they are issued by the processor, the processor can complete the first write operation and proceed to the next operation without delay, be it a write or some other type of operation. To ensure that a second write does not pass the first write, the invalidate requests are queued. The second invalidate request is not transmitted through the network until the previous invalidate requests are complete. The invention takes advantage of the fact that most of the time a write. operation is not followed by another write operation, and even if it is, it is even rarer for more than two write operations to follow each other closely. The queue thus will rarely fill and will empty during read operations when no invalidates are emitted.

Figure 7:
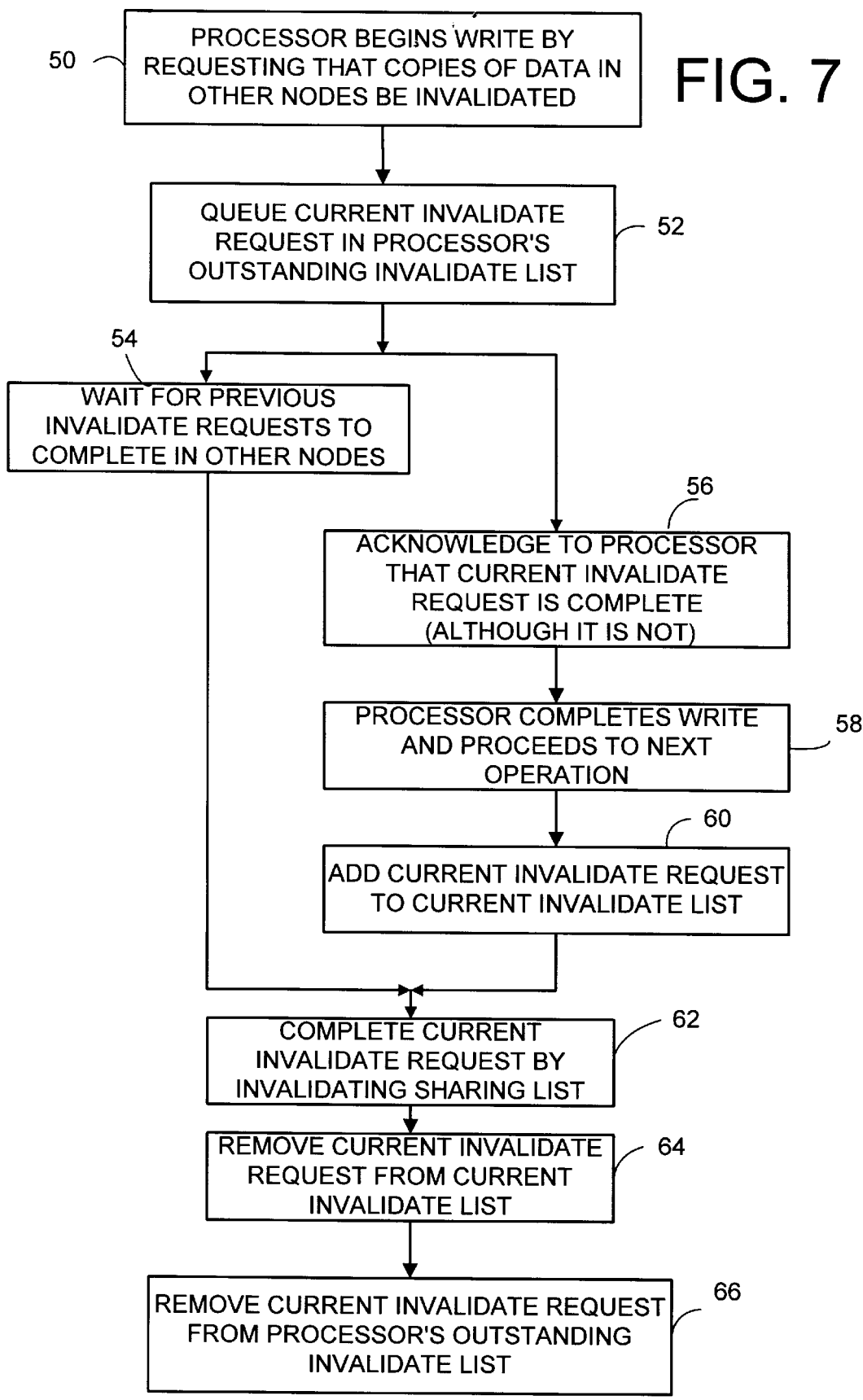
FIG. 7 is a flowchart of a method according to the invention for allowing multiple write operations to proceed while maintaining memory consistency.

FIG. 7 illustrates the operation of the preferred embodiment according to the invention. Initially a processor in a first node begins a write operation by requesting that copies of the data in other nodes within the multinode computer be invalidated (step 50). These other nodes are linked together through a sharing list. This current processor request is passed to protocol engine 40, which queues the request at the tail of the queue in the processor's outstanding invalidate list 46 (step 52). As part of the queueing, protocol engine 40 adds to the list a task number spawned to invalidate the request and also notes in the list that the processor has an outstanding, or pending, invalidate request such as by setting a bit. Protocol engine 40 acknowledges to the processor that the current invalidate request is complete, although it is not (step 56). This premature acknowledgment permits the processor to complete the write operation by changing the data and also permits the processor to proceed with its next operation (step 58). When this acknowledgment is given, protocol engine 40 also adds the current invalidate request to the node's current invalidate list 48 (step 60) such as by setting a bit indicating that a task for invalidating the data has been spawned. While the protocol engine 40 is acknowledging invalidate requests and adding them to the current invalidate list 48, it waits for previous invalidate requests to complete in the other nodes (step 54). This waiting ensures that the current invalidate request cannot pass previous invalidate requests. (If another invalidate request is generated while waiting for the previous invalidate requests to complete, then the current invalidate request becomes, in effect, a previous invalidate request and is taken up in the order of the queue.)

Once the previous invalidate requests are complete, protocol engine 40 proceeds. It completes the current invalidate request by invalidating the sharing list for the data affected by the write operation (step 62). It removes the current invalidate request from the current invalidate list (step 64). It also removes the current invalidate request from the processor's outstanding invalidate list (step 66). The protocol engine then checks the processor's outstanding invalidate list 46 to determine if the processor has another invalidate request to generate. If not, it clears the list, indicating there are no outstanding invalidate requests. If so, it generates another invalidate request once the previous invalidate requests are complete.

In the preferred embodiment, protocol engine 40 generates the invalidate request by notifying nodes (which are the elements in the sharing list related to the current invalidate request) that data shared by the nodes is invalid. This notification can be done in the conventional manner specified by SCI, or can be done by relaying the invalidate request from one node to the next until all nodes in the list have been notified.

In another aspect of the invention, memory consistency is maintained where the protocol engine 40 of a node is reading a signal from a processor or I/O device which is ready for transmission to another node. This signal can take many forms, such as data being supplied to another node in response to a read request, or an interrupt signal indicating that an update of data is complete.

Figure 8:
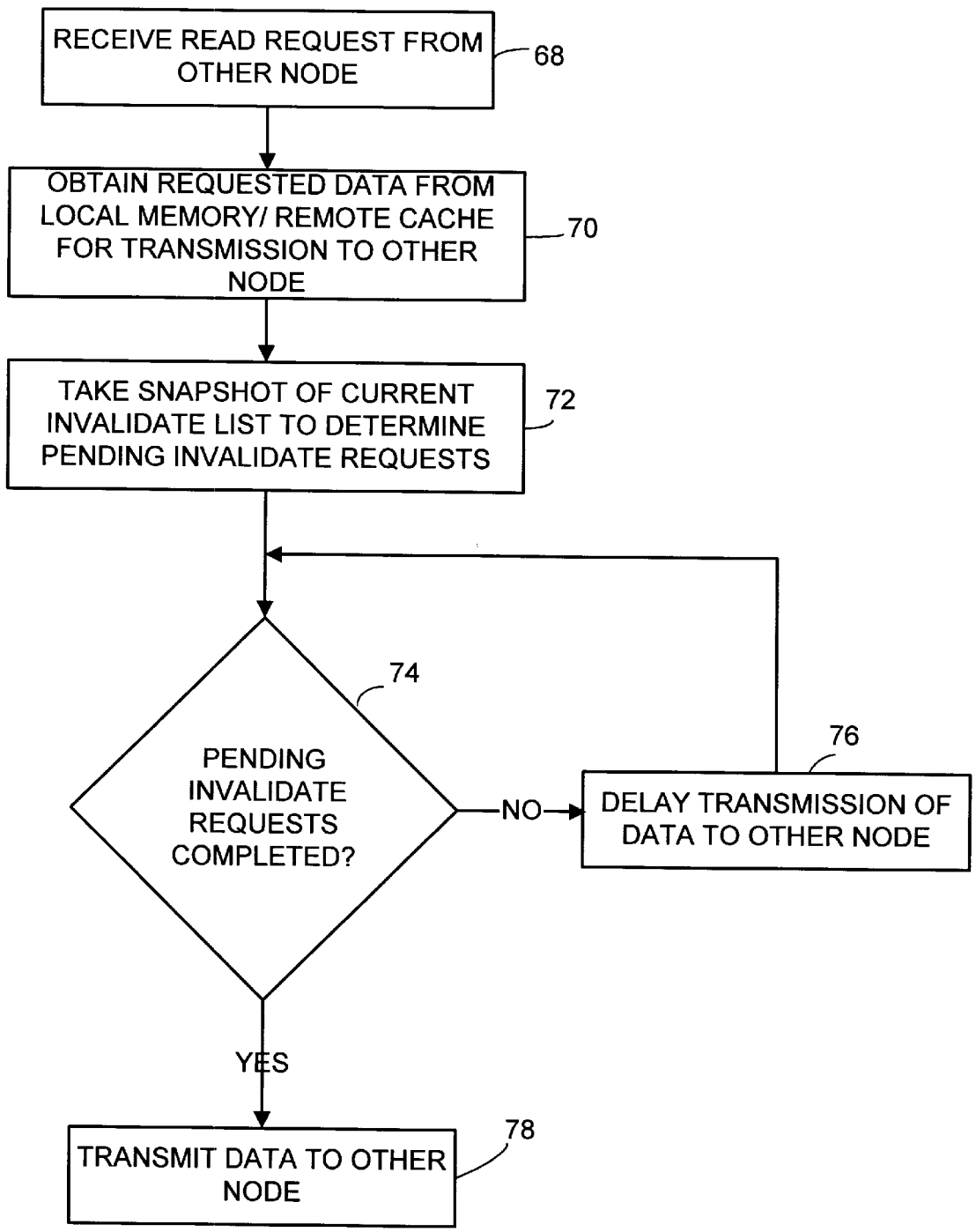
FIG. 8 is a flowchart of a method according to the invention for allowing a read operation to follow a write operation while maintaining memory consistency.

FIG. 8 shows the method where the data ready for transmission is data stored in a first node, and there is concern that the data not be read by another node until outstanding invalidate requests related to that data are complete (i.e., a read passing a write). This situation could arise, for example, where a processor on a first node is updating data and, when finished, sets a "done bit" to indicate to other nodes that the data is ready for use. In updating the data, the processor generates an invalidate request that is transmitted throughout the multinode computer to alert the other nodes that the old data they hold is invalid. The processors on the other nodes read the "done" bit to know when they may read this data. However, if the done bit is read before the invalidate request is complete, then the processor on the second node sees the old data as valid and incorrectly reads it, rather than seeking the updated data. To prevent this, a request by the second node to read the done bit must not be answered until after the invalidating request is complete.

Referring to FIG. 8, a protocol engine 40 in the first node receives a read request for data from a requester such as a processor in a second node (step 68). It then obtains the requested data from the local memory or remote cache for transmission to the read requester (step 70). Before sending the data, however, the protocol engine takes a snapshot of the current invalidate list 48 (step 72) to determine the then-pending invalidate requests. The protocol engine then checks if there is a pending invalidate request (are pending invalidate requests complete ?) (step 74). If the pending requests are not complete, then the protocol engine delays transmission of the data to the read requester (step 76). Once the invalidate requests are complete, the data is transmitted to the read requester (step 78).

Figure 9:
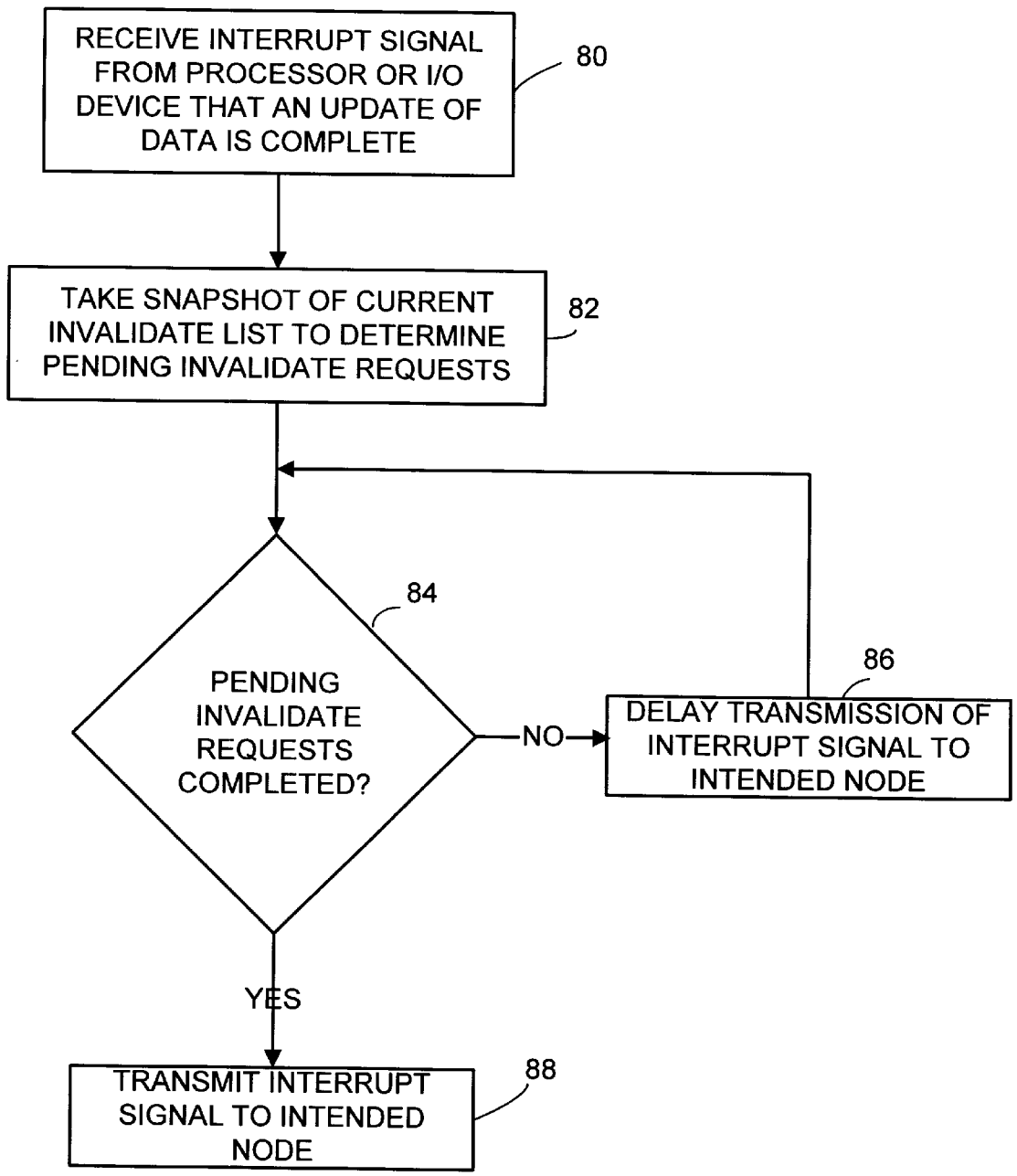
FIG. 9 is a flowchart of a method according to the invention for allowing an interrupt signal to follow a write operation while maintaining memory consistency.

The same method can be employed for interrupt signals that indicate that an update of data is complete. The interrupt signal can be generated by a processor in a first node or by an I/O device coupled to the first node to indicate that a buffer of data is filled. The need is to prevent the interrupt signal from arriving at a second node before the invalidate requests for the data in the buffer are complete. Otherwise, the second node may consider the invalid data "updated." FIG. 9 shows a series of steps 80-88 where the data ready for transmission is an interrupt signal indicating that an update of data, such as in a buffer, is complete. The procedure is similar to that employed in response to a read request, (compare steps 70–78 in FIG. 8, e.g.). Here, however, it is the interrupt signal that is delayed by the protocol engine in the first node from transmission to the intended recipient node until all of the invalidate requests associated with updating the buffer are complete.

Specifically, the protocol engine on a node receives an interrupt signal from a processor on its node or a connected I/O device indicating that an update of data is complete (step 80). The protocol engine then takes a snapshot of the current invalidate list to determine if there are any pending invalidate requests (step 82). It checks the snapshot to see if all invalidate requests are complete (step 84). If not, the protocol engine delays transmission of the interrupt signal to the intended node until such requests are complete (step 86). Once complete, it transmits the interrupt signal to the intended node (step 88).

Having illustrated and described the principles of the invention in a preferred embodiment, it should be apparent to those skilled in the art that the preferred embodiment can be modified in arrangement and detail without departing from such principles. For example, many of the software aspects of the embodiment may be implemented in hardware and many of the hardware aspects may be implemented in software. The invention may be used with network interfaces other than SCI. In view of the many possible embodiments to which the principles of the invention may be applied, it should be recognized that the illustrated embodiment is only a preferred example of the invention and should not be taken as a limitation on the scope of the following claims. We claim as the invention all that comes within the scope of these claims.

We claim:

1. A method of maintaining memory consistency in a multinode computer, the method comprising the following steps:

queuing a current invalidate request by a processor;

acknowledging to the processor that the queued current invalidate request is complete before it has actually completed;

waiting for previous invalidate requests by the processor to complete; and once the previous invalidate requests are complete, completing the queued current invalidate request.

2. The method of claim 1 wherein the memory consistency maintained is processor consistency.

3. The method of claim 1 wherein queuing the current invalidate request further includes adding the current invalidate request to a processor's outstanding invalidate list.

4. The method of claim 3 wherein queuing the current invalidate request further includes removing the current invalidate request from the processor's outstanding invalidate list after the current invalidate request is complete.

5. The method of claim 1 further including adding the current invalidate request to a current invalidate list after acknowledging to the processor that the current invalidate request is complete before it has completed.

6. The method of claim 5 further including removing the current invalidate request from the current invalidate list after the current invalidate request is complete.

7. The method of claim 1 wherein completing the current invalidate request comprises notifying the nodes in a linked list related to the current invalidate request that data shared by the nodes is invalid.

8. The method of claim 7 wherein notifying the nodes comprises relaying an invalidate request from a node in which the processor resides to each node in the list, the notification relayed from one node to the next until all nodes in the list have been notified.

9. The method of claim 1 further including:

receiving a read request for data on a first node from a second node;

determining if there is a pending invalidate request by a processor in the first node;

if so, delaying transmission of the data to the second node until the pending invalidate request is complete; and if not, transmitting the data to the second node.

10. The method of claim 9 wherein the determining step includes taking a snapshot of a current invalidate list, the list containing acknowledgments to the processor that an invalidate request is complete before it has completed, to determine the pending invalidate requests.

11. The method of claim 9 including obtaining the requested data from storage in the first node before determining if there is a pending invalidate request.

12. The method of claim 1 including:

receiving an interrupt signal on a first node that an update of data is complete;

determining if there is a pending invalidate request;

if so, delaying transmission of the interrupt signal to a second node until the pending invalidate request is complete;

if not, transmitting the interrupt signal to the second node.

13. The method of claim 12 wherein the determining step includes taking a snapshot of a current invalidate list, the list containing acknowledgments to the processor that an invalidate request is complete before it has completed, to determine the pending invalidate requests.

14. A computer readable medium on which is stored a computer program for executing the steps of claim 1.

15. An apparatus for maintaining memory consistency in a multinode computer comprising:

a queue for queuing current invalidate requests by a processor; and a protocol engine for:

acknowledging to the processor that a current invalidate request is complete before it has actually completed;

waiting for previous invalidate requests by the processor to complete; and once the previous invalidate requests are complete, completing the queued current invalidate request.

16. A computer readable medium on which is stored a computer program for executing the steps of claim 15.

17. A method of maintaining memory consistency in a multinode computer, the method comprising the following steps:

receiving a signal from a processor or input/output (I/O) device in a first node which is ready for transmission to a second node;

determining if there is a pending invalidate request by the processor or I/O device;

if so, delaying transmission of the signal to the second node until the pending invalidate request is complete; and if not, transmitting the signal to the second node.

18. The method of claim 17 wherein the signal ready for transmission is data supplied by the processor in response to a read request from the second node.

19. The method of claim 17 wherein the signal ready for transmission is an interrupt signal indicating that an update of data is complete.

20. The method of claim 17 wherein the determining step further includes taking a snapshot of a current invalidate list.

21. An apparatus for maintaining memory consistency in a multinode computer comprising:

a current invalidate list containing pending invalidate requests by a processor or I/O device; and a protocol engine for:

receiving a signal from a processor or input/out (I/O) device in a first node which is ready for transmission to a second node;

determining from the list if there is a pending invalidate request;

if so, delaying transmission of the signal to the second node until the pending invalidate request determined from the list is complete; and if not, transmitting the signal to the second node.

22. A method of maintaining memory consistency in a multiprocessor computer, the method comprising the following steps:

queuing a current invalidate request by a processor;

acknowledging to the processor that the queued current invalidate request is complete before it has actually completed;

waiting for a previous invalidate request by the processor to complete; and completing the queued current invalidate request once the previous invalidate request is complete.

23. An apparatus for maintaining memory consistency in a multiprocessor computer comprising:

a queue for queuing current invalidate requests by a processor;

means for acknowledging to the processor that a queued current invalidate request is complete before it has actually completed;

means for waiting for a previous invalidate request by the processor to complete; and means for completing the queued current invalidate request once the previous invalidate request is complete.

* * * * *

UNITED STATES PATENT AND TRADEMARK OFFICE
CERTIFICATE OF CORRECTION

PATENT NO. : 5900020
DATED : May 4, 1999
INVENTOR(S) : Safranek et al.

It is certified that error appears in the above-identified patent and that said Letters Patent is hereby corrected as shown below:

| Col./Line | Error Reads | Should Read |
|---|---|---|
| 8/13 | bit or list | bit list |
| 8/14 | emement | element |

Signed and Sealed this

Seventeenth Day of April, 2001

Attest:

NICHOLAS P. GODICI

Attesting Officer     Acting Director of the United States Patent and Trademark Office